(12) United States Patent
Nameda

(10) Patent No.: US 9,696,584 B2
(45) Date of Patent: Jul. 4, 2017

(54) DISPLAY DEVICE

(71) Applicant: Funai Electric Co., Ltd., Daito, Osaka (JP)

(72) Inventor: Makoto Nameda, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 133 days.

(21) Appl. No.: 14/160,845

(22) Filed: Jan. 22, 2014

(65) Prior Publication Data

US 2014/0218662 A1 Aug. 7, 2014

(30) Foreign Application Priority Data

Feb. 5, 2013 (JP) ................................ 2013-020276

(51) Int. Cl.
*G02F 1/1335* (2006.01)
*F21V 8/00* (2006.01)

(52) U.S. Cl.
CPC ..... *G02F 1/133605* (2013.01); *G02B 6/0055* (2013.01)

(58) Field of Classification Search
CPC .... G02F 1/133605; G02B 6/0055; F21V 7/04
See application file for complete search history.

(56) References Cited

U.S. PATENT DOCUMENTS 8,602,580 B2 * 12/2013 Ikuta ............................ 362/97.1
8,622,565 B2 * 1/2014 Kawada ....................... 362/97.2
8,632,200 B2 * 1/2014 Takeuchi et al. ............ 362/97.1
8,944,641 B2 * 2/2015 Kasai ............................ 362/297
2005/0265020 A1 12/2005 Kim

FOREIGN PATENT DOCUMENTS

| EP | 2157474 A1 | 2/2010 |
| EP | 2508790 A1 | 10/2012 |
| JP | 2009-003064 A | 1/2009 |
| JP | 2010-49846 A | 3/2010 |

OTHER PUBLICATIONS

Extended European Search Report of the corresponding European Application No. 14153687.0, dated May 13, 2014.

* cited by examiner

*Primary Examiner* — Kendrick Hsu
(74) *Attorney, Agent, or Firm* — Global IP Counselors, LLP

(57) ABSTRACT

A display device includes a display component, a light source, a rear side support member, and a reflective sheet. The light source is disposed on a rear side of the display device relative to the display component. The reflective sheet includes a bottom face part, a first side face part and a second side face part. The bottom face part is disposed on a front side of the display device relative to the rear side support member. The first and second side face parts are arranged relative to the bottom face part corresponding to adjacent side edges of the bottom face part, respectively. One of the first and second side face parts includes first and second portions with adjacent end sections, respectively. The adjacent end sections overlap with respect to each other while the reflective sheet is attached to the rear side support member.

19 Claims, 13 Drawing Sheets

DISPLAY DEVICE

CROSS-REFERENCE TO RELATED APPLICATIONS

This application claims priority to Japanese Patent Application No. 2013-020276 filed on Feb. 5, 2013. The entire disclosure of Japanese Patent Application No. 2013-020276 is hereby incorporated herein by reference.

BACKGROUND

Field of the Invention

This invention generally relates to a display device. More specifically, the present invention relates to a display device having a reflective sheet for reflecting light from a light source towards a display component.

Background Information

Generally, display devices having a reflective sheet for reflecting light from a light source towards a display component are well known in the art (see Japanese Unexamined Patent Application Publication No. 2010-49846 (Patent Literature 1), for example).

The above-mentioned Patent Literature 1 discloses a directly backlit type of device (e.g., a display device) having a concave (rectangular in plan view) sheet body (e.g., a reflective sheet) for reflecting light from a light source towards a liquid crystal cell (e.g., a display component). With this display device, the sheet body is folded so as to include a rectangular bottom face part and four side face parts disposed so as to surround the rectangular bottom face part. More specifically, when the sheet body is spread out flat, slits are formed at the four corners of the sheet body (at the boundaries between the four side face parts). The sheet body is formed into a concave shape by folding it such that the end edges of adjacent side face parts contact via these slits.

SUMMARY

With the directly backlit device disclosed in Patent Literature 1, slits are formed at the four corners of the sheet body at the boundaries between the four side face parts. It has been discovered that when the sheet body is folded such that the end edges of adjacent side face parts contact via the slits, then gaps tend to occur at these contact portions at the boundary between two side face parts. Therefore, it has been discovered that light from the light source tends to leak through the gaps at the four corners of the sheet body. Thus, the four corners of the display screen can be displayed darker.

One aspect is to provide a display device with which a part of the display screen are kept from being displayed darker.

In view of the state of the known technology, a display device is provided that includes a display component, a light source, a rear side support member, and a reflective sheet. The light source is disposed on a rear side of the display device relative to the display component. The light source is configured to irradiate the display component with light. The rear side support member supports the light source from the rear side. The reflective sheet is configured to reflect the light from the light source towards the display component. The reflective sheet includes a bottom face part, a first side face part and a second side face part. The bottom face part is disposed on a front side of the display device relative to the rear side support member. The first and second side face parts are arranged relative to the bottom face part corresponding to adjacent side edges of the bottom face part, respectively. One of the first and second side face parts includes first and second portions with adjacent end sections, respectively. The adjacent end sections overlap with respect to each other while the reflective sheet is attached to the rear side support member.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 to 7, a liquid crystal television set 100 is illustrated in accordance with one embodiment. The liquid crystal television set 100 is an example of the "display device" of the present invention. In the illustrated embodiment, while the liquid crystal television set 100 is illustrated as an example of the display device, it will be apparent to those skilled in the art from this disclosure that the present invention can be applied to different types of display devices.

Figure 1:
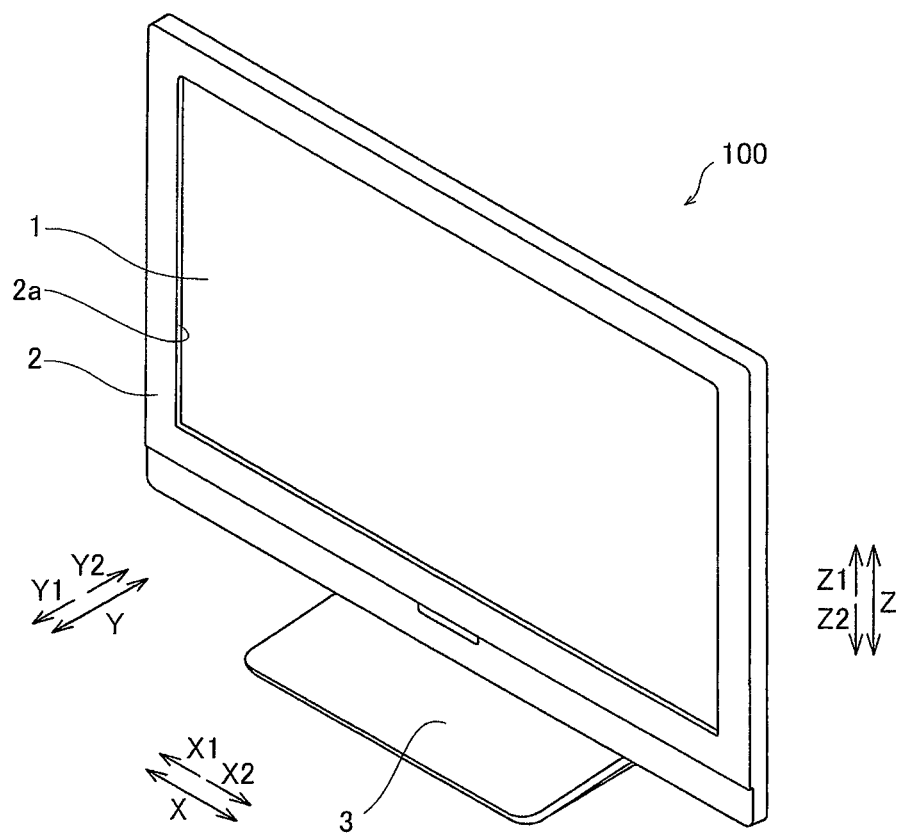
FIG. 1 is a front perspective view of the overall configuration of a liquid crystal television set in accordance with one embodiment.
Figure 2:
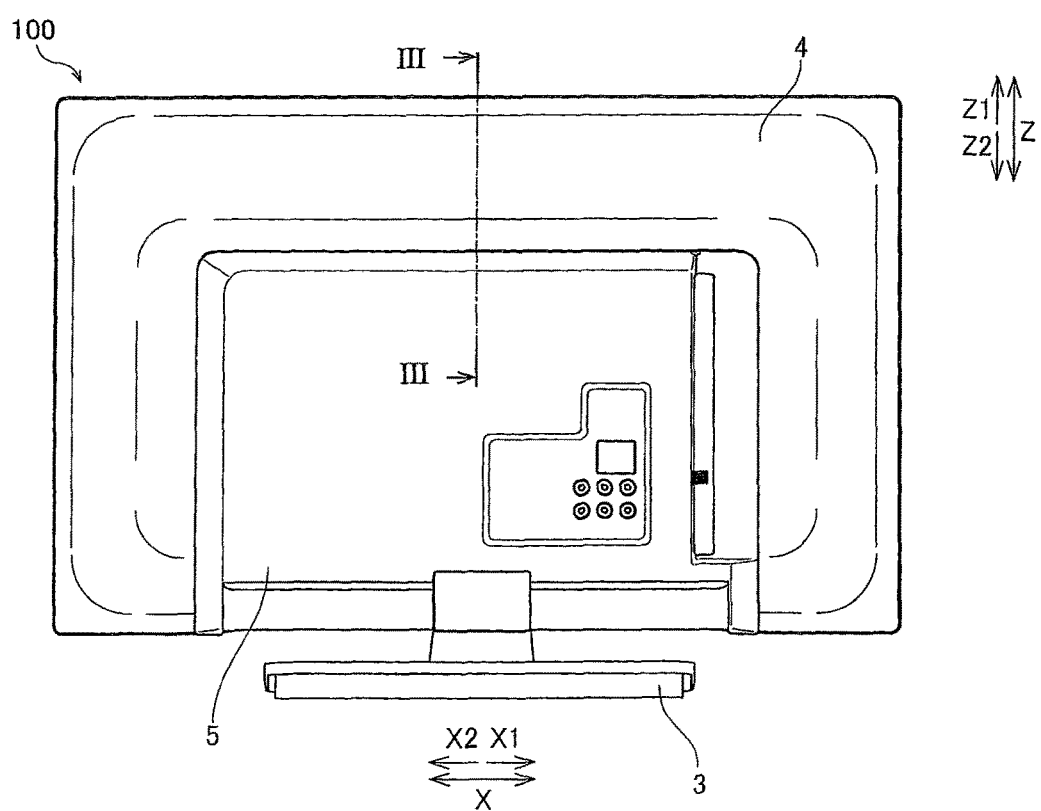
FIG. 2 is a rear elevational view of the liquid crystal television set shown in FIG. 1.
Figure 3:
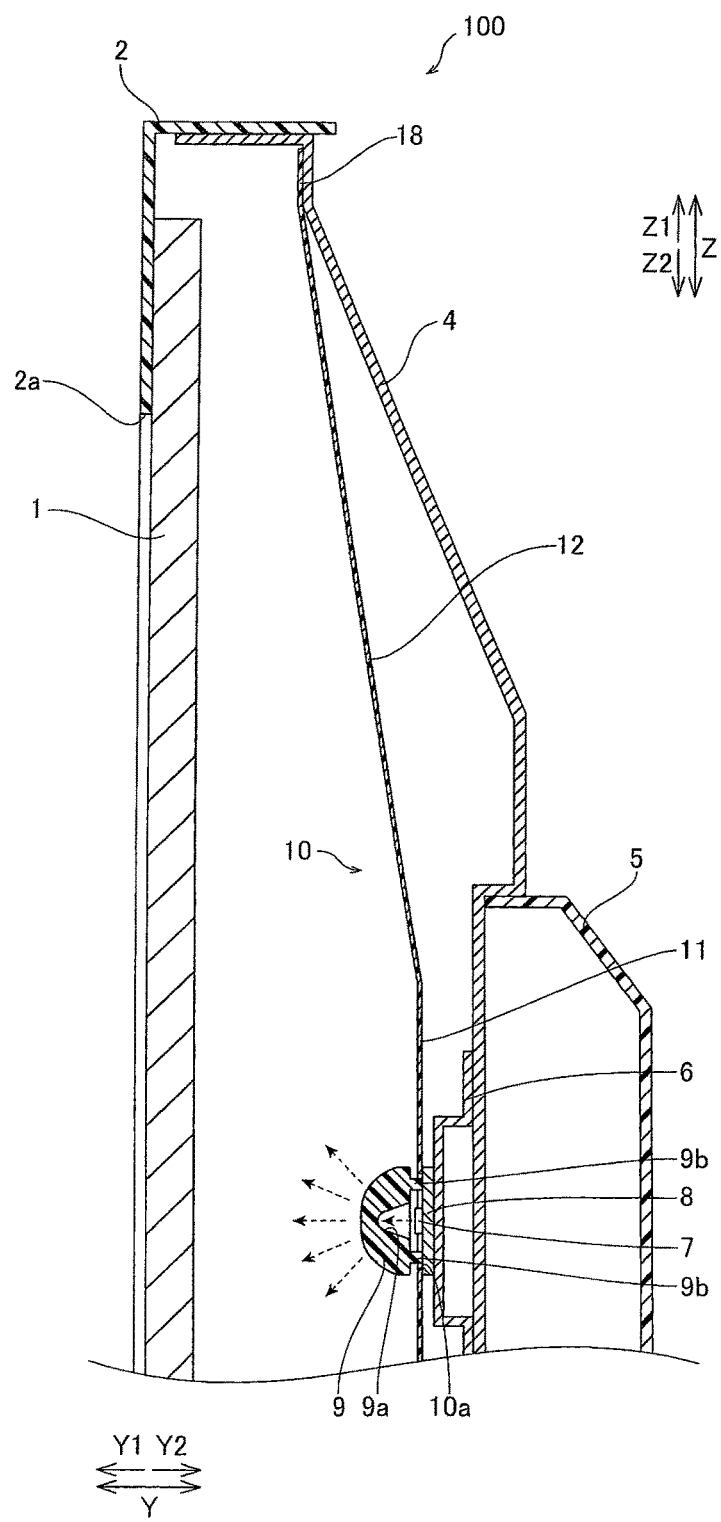
FIG. 3 is an enlarged, partial cross sectional view of the liquid crystal television set shown in FIG. 1, taken along line in FIG. 2.

As shown in FIGS. 1 and 2, the liquid crystal television set 100 includes a display component 1, a front housing 2, and a stand member 3. The display component 1 has liquid crystal cells that display video. In other words, the display component 1 includes a liquid crystal panel. The front housing 2 is made of plastic and supports the display component 1 from the front side (the arrow Y1 direction side). The stand member 3 is made of plastic and supports the liquid crystal television set 100 from below (the arrow Z2 direction side). The front housing 2 is formed in the shape of a frame that is rectangular as seen from the front (as seen from the arrow Y1 direction side). More specifically, a rectangular opening 2a for exposing the display component 1 is provided near the center of the front housing 2. As shown in FIG. 3, the front housing 2 is formed in a concave shape that is recessed forward (the arrow Y1 direction). In the illustrated embodiment, while the display component 1 is illustrated as having liquid crystal cells, it will be apparent to those skilled in the art from this disclosure that the present invention can be applied to different types of display components.

As shown in FIGS. 2 and 3, the liquid crystal television set 100 further includes a rear frame 4 and a plastic cover member 5. The rear frame 4 is made of sheet metal and supports the display component 1 from the rear face side (e.g., the rear side) (the arrow Y2 direction side). This rear frame 4 has a rectangular shape that fits into the rear face side of the front housing 2. Also, the rear frame 4 is formed in a concave shape that is recessed rearward (in the arrow Y2 direction). The rear frame 4 is fixed to the front housing 2 by fastening members (not shown). The cover member 5 has a rectangular shape that is smaller than the rear frame 4. The cover member 5 is disposed on the rear face side of the rear frame 4. The cover member 5 is provided so as to cover the various kinds of board (not shown), such as a power supply board or a signal processing board, that are disposed on the rear face of the rear frame 4. The cover member 5 is fixed to the rear frame 4 by fastening members (not shown). The rear frame 4 and the cover member 5 form a rear housing corresponding to the front housing 2. The rear frame 4 is an example of the "rear side support member" of the present invention.

Figure 4:
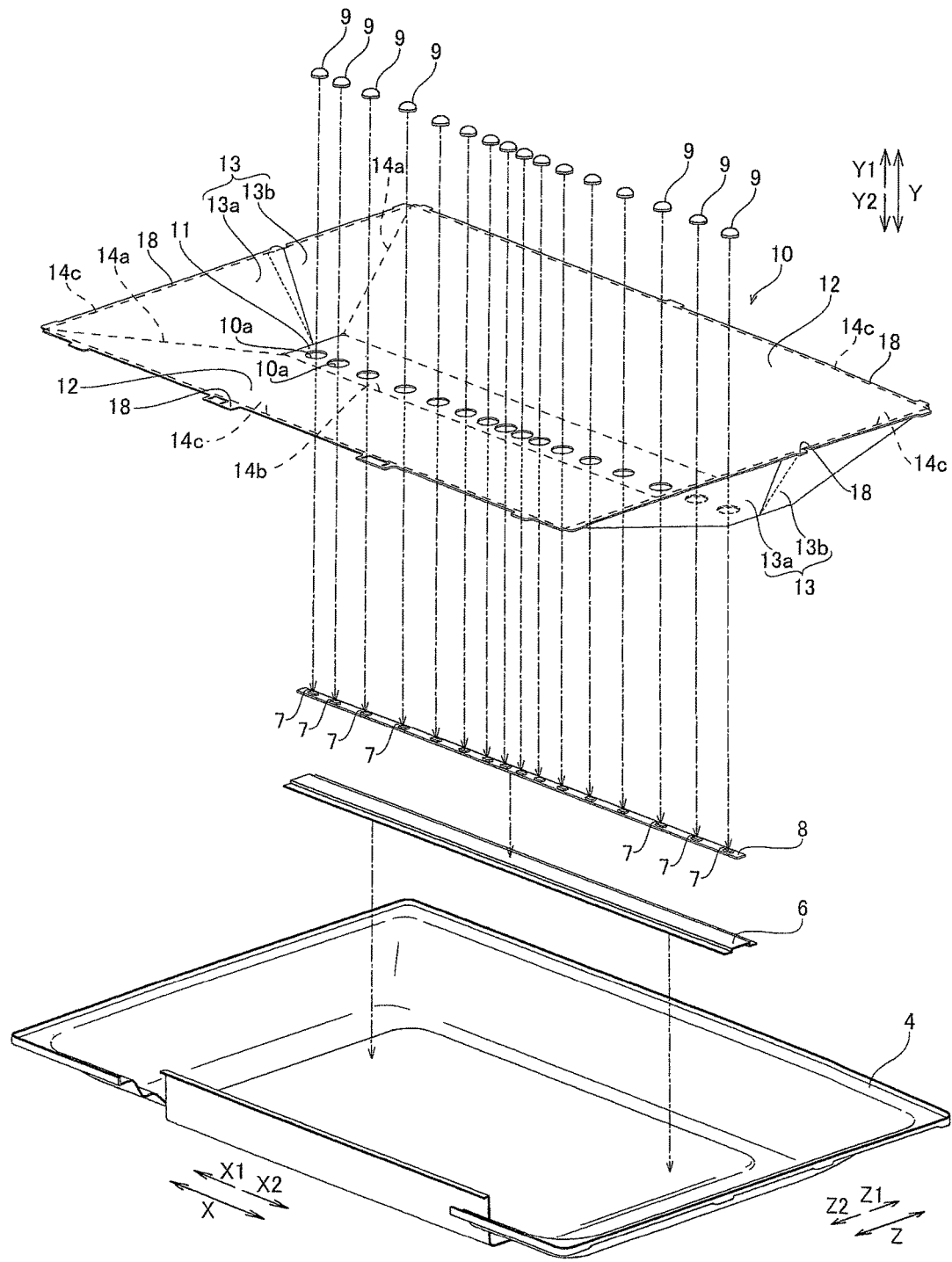
FIG. 4 is an exploded perspective view of the liquid crystal television set shown in FIG. 1, illustrating a rear frame, a heat sink, a LED substrate, a reflective sheet, and a plurality of diffusing lens of the liquid crystal television set.

As shown in FIGS. 3 and 4, the liquid crystal television set 100 further includes a sheet metal heat sink 6, a plurality of LEDs (light emitting diodes) 7, a LED substrate 8, a plurality of diffusing lenses 9, and a reflective sheet 10. The heat sink 6 is disposed on the front of the rear frame 4 (the face on the arrow Y1 direction side). The LEDs 7 are mounted on the LED substrate 8. The LEDs 7 irradiate the display component 1 with light from the rear face side (the arrow Y2 direction side). The LED substrate 8 is disposed on the front of this heat sink 6. As shown in FIG. 4, the LEDs 7 are mounted on the front of the LED substrate 8, spaced apart in the direction in which the LED substrate 8 extends (the X direction). The LEDs 7 are an example of the "light source" of the present invention. In the illustrated embodiment, while the LEDs 7 are illustrated as an example of the light sources, it will be apparent to those skilled in the art from this disclosure that the light sources can be different types of light sources.

As shown in FIGS. 3 and 4, the diffusing lenses 9 respectively cover the plurality of LEDs 7. The diffusing lenses 9 are attached to the front of the LED substrate 8 where the plurality of LEDs 7 are mounted (the face on the arrow Y1 direction side). These diffusing lenses 9 are made of acrylic or another such plastic, and have the function of diffusing light emitted by the LEDs 7 to the display component 1 side (see the dotted arrows in FIG. 3). As shown in FIG. 3, concave components 9a are provided near the center of the bottom face of the diffusing lenses 9 (at positions corresponding to the LEDs 7 on the surface of the LED substrate 8). The diffusing lenses 9 are provided with columnar bosses 9b that extend from the bottom faces of the diffusing lenses 9 to the LED substrate 8 side. These bosses 9b are adhesively bonded to the front of the LED substrate 8, thereby attaching the diffusing lenses 9 at positions corresponding to the LEDs 7 on the front of the LED substrate 8.

As shown in FIGS. 3 and 4, the reflective sheet 10 reflects light from the LEDs 7 to the display component 1 side. The reflective sheet 10 is disposed between the LED substrate 8 and the diffusing lenses 9. Various kinds of optical member (not shown), such as a diffuser plate that further diffuses light diffused by the diffusing lenses 9 to the display component 1 side, are disposed between this reflective sheet 10 and the display component 1.

Figure 5:
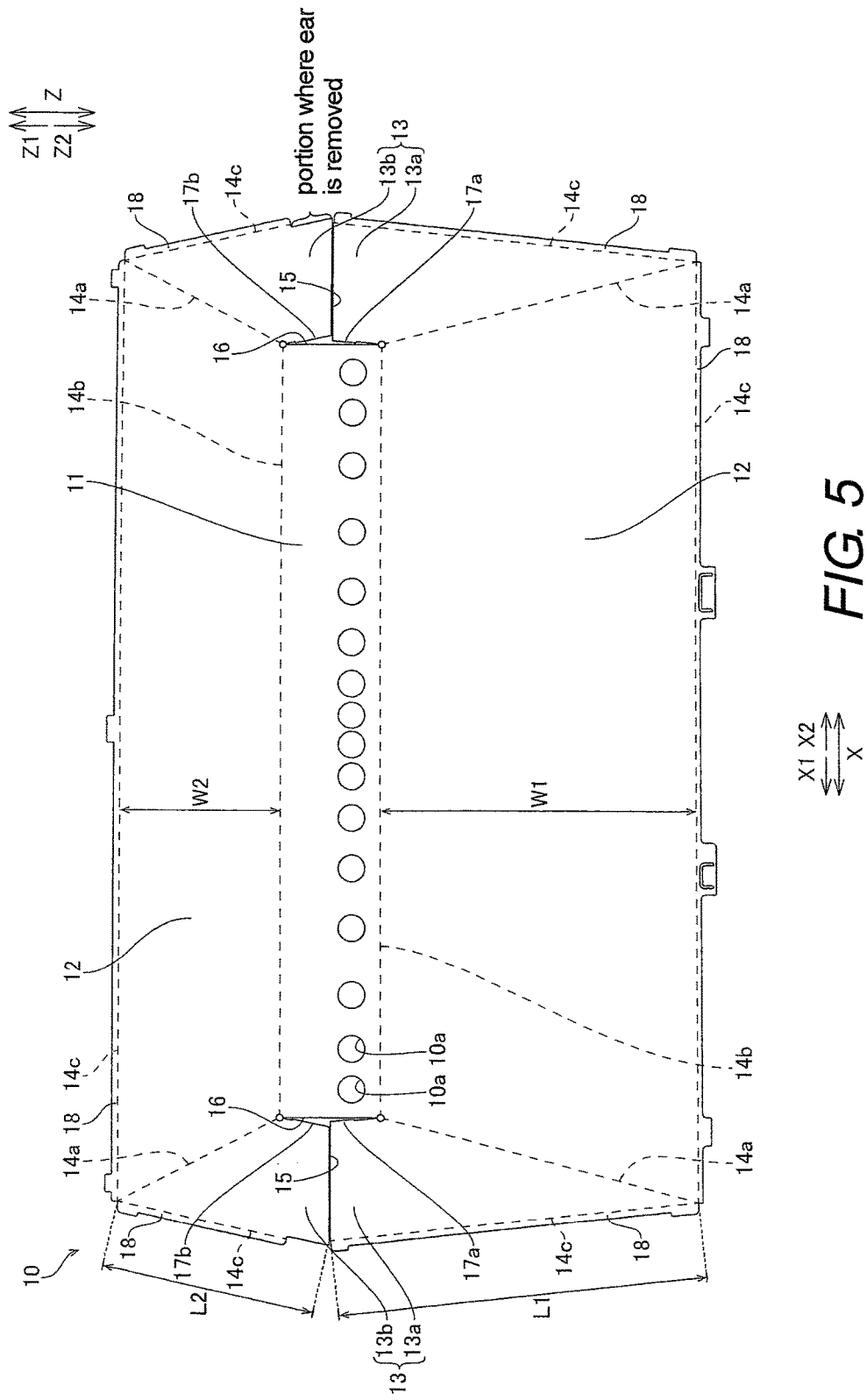
FIG. 5 is a development view of the reflective sheet, illustrating the reflective sheet spread out flat.

As shown in FIGS. 4 to 7, in this embodiment, the reflective sheet 10 is configured by folding a single plastic sheet having optical reflectivity. In other words, the reflective sheet 10 is integrally formed by a plastic sheet material as a one-piece, unitary member. More specifically, the reflective sheet 10 is folded so as to include a rectangular bottom face part 11 and four side face parts (a pair of long-side side face parts 12 and a pair of short-side side face parts 13) (e.g., first, second, third, and fourth side face parts). The bottom face part 11 is disposed on the front of the rear frame 4 (e.g., the face on the arrow Y1 direction side). The four side face parts are disposed so as to surround the four sides of the rectangular bottom face part 11. As shown in FIGS. 4 and 5, a plurality of holes 10a corresponding to the plurality of LEDs 7 (diffusing lenses 9) are provided in a straight line in a portion of the reflective sheet 10 that is lower than (on the arrow Z2 direction side of) the center part of the bottom face part 11 in the up and down direction (Z direction). The holes 10a are spaced apart in the left and right direction (X direction) with respect to each other.

As shown in FIG. 5, the bottom face part 11 has a rectangular shape extending in the lengthwise direction (X direction) of the rear frame 4. The pair of long-side face parts 12 are connected to the pair of long sides of the bottom face part 11 (the pair of sides extending in the left and right direction (the X direction) on both sides in the up and down direction (the Z direction)). The pair of short-side face parts 13 are disposed adjacent to the pair of short sides of the bottom face part 11 (the pair of sides extending in the up and down direction (the Z direction) on both sides in the left and right direction (the X direction)). The width W1 in the up and down direction of the long-side side face parts 12 connected to the long sides on the lower side (the arrow Z2 direction side) of the bottom face part 11 is greater than the width W2 in the up and down direction of the long-side side face parts 12 connected to the long sides on the upper side (the arrow Z1 direction side) of the display component 1.

As shown in FIG. 4, the reflective sheet 10 is configured such that it is folded without forming a slit at the boundaries between the long-side side face parts 12 and the short-side side face parts 13 (the four corners of the rectangular reflective sheet 10), and such that it has a shape that conforms to the rear frame 4 (a concave shape that is recessed to the arrow Y2 direction side) in a state of being disposed on the front of the rear frame 4. More specifically, as shown in FIGS. 4 to 7, the reflective sheet 10 is folded along perforations 14a and 14b. The perforations 14a are formed at the boundaries between the long-side side face parts 12 and the short-side side face parts 13. The openings of the perforations 14a are closed during formation such that the perforations 14a do not transmit light. The perforations 14b are formed at the boundaries between the bottom face part 11 and the long-side side face parts 12. The openings of the perforations 14b are closed during formation such that the perforations 14b do not transmit light.

Figure 6:
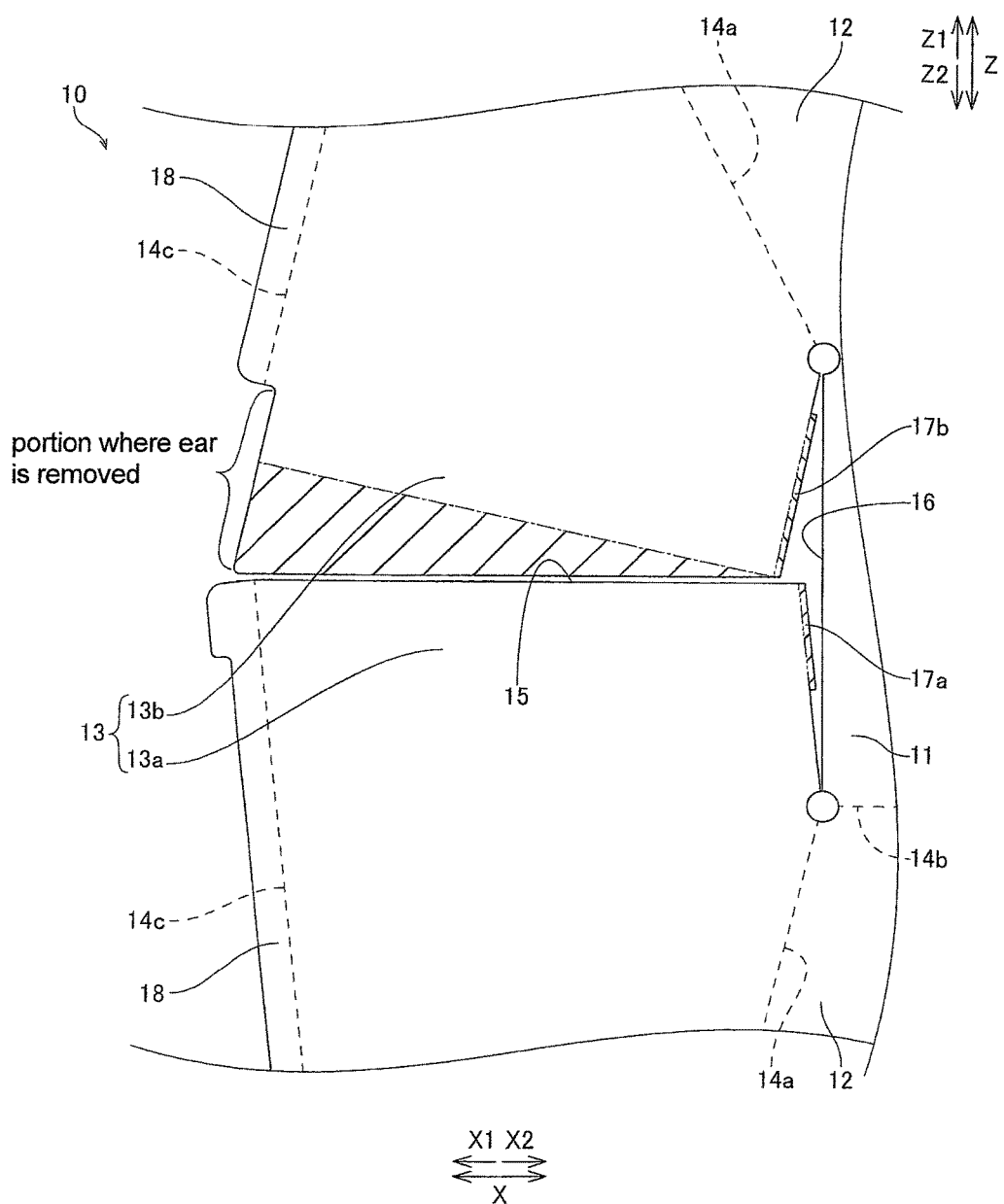
FIG. 6 is an enlarged, partial plan view of the reflective sheet shown in FIG. 5, illustrating first and second slits of the reflective sheet.

As shown in FIGS. 5 and 6, the reflective sheet 10 includes first slits 15 that each separate corresponding one of the short-side side face parts 13 (e.g., one of the first and second side face parts) into a first portion 13a and a second portion 13b in a state in which the reflective sheet 10 has been spread out flat. The first slits 15 are formed near the center of each of the pair of short-side side face parts 13 in the up and down direction (Z direction). As shown in FIG. 5, these first slits 15 are formed so as to extend in a straight line in a direction (X direction) that intersects the direction in which the short-side side face parts 13 extend. Specifically, these first slits 15 are formed at positions of the short-side side face parts 13 that are on the upper side (the arrow Z1 direction side) of the plurality of holes 10a provided to the bottom face part 11 (positions of the short-side side face parts 13 corresponding to the center of the bottom face part 11 in the up and down direction).

Since in the illustrated embodiment, the reflective sheet 10 is mirror symmetrically formed relative to a center line along the up and down direction, only the left-side (X1 direction side) configuration of the reflective sheet 10 will be described for simplifying the illustration. Thus, although the detailed description of the right-side configuration of the reflective sheet 10 will be omitted for the sake of brevity unless otherwise stated, it will be apparent to those skilled in the field from this disclosure that the following descriptions of the left-side configuration can be applied to the right-side configuration of the reflective sheet 10 in a mirror symmetric manner. As shown in FIGS. 5 and 6, the first and second portions 13a and 13b are formed so as to extend in directions that are sloped outwardly (on the opposite side from the bottom face part 11) with respect to the up and down direction (Z direction) from both ends of the long-side side face parts 12 in the left and right direction (X direction) in a state in which the reflective sheet 10 has been spread out flat. The first portions 13a are disposed lower than (on the arrow Z2 direction side of) the second portions 13b, respectively, in a state in which the reflective sheet 10 has been spread out flat. The length L1 (see FIG. 5) of the first portion 13a in a direction that intersects the first slit 15 along the outer peripheral part on the opposite side from the bottom face part 11 is greater than the length L2 (see FIG. 5) of the second portion 13b in a direction that intersects the first slit 15 along the outer peripheral part on the opposite side from the bottom face part 11.

Figure 7:
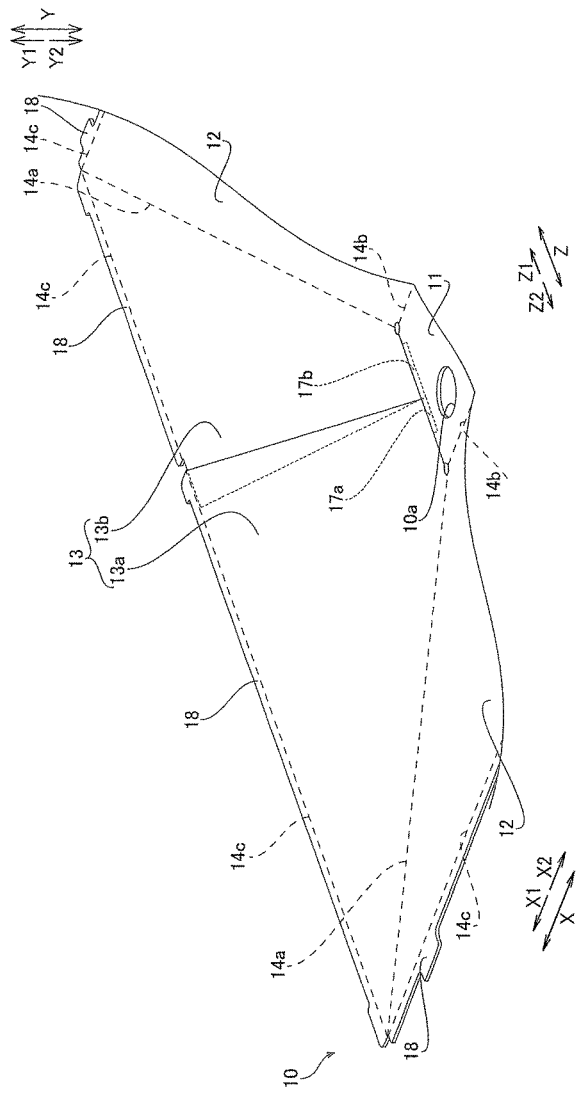
FIG. 7 is an enlarged, partial perspective view of the reflective sheet, illustrating a state in which the reflective sheet shown in FIG. 5 has been folded into a shape that conforms to the rear frame.

As shown in FIGS. 4 and 7, the first portion 13a and the second portion 13b are disposed so as to overlap each other near their ends on the first slit 15 side in a state in which the reflective sheet 10 is disposed on the front of the rear frame 4 (in a state in which the reflective sheet 10 is formed in a concave shape conforming to the front of the rear frame 4 (the face on the arrow Y1 direction side)). In this state in which the reflective sheet 10 is formed in a concave shape conforming to the front of the rear frame 4, the first portion 13a is disposed above (on the inside of) the second portion 13b. That is, in a state in which the reflective sheet 10 is formed in a concave shape conforming to the front of the rear frame 4, of the first portion 13a and the second portion 13b, the one that is longer in a direction that intersects the first slit 15 in the outer peripheral part on the opposite side from the bottom face part 11 (the first portion 13a having the length L1, which is greater than L2 (see FIG. 5)) is disposed on the upper side. In FIG. 6, the portion where the second portion 13b overlaps the first portion 13a (the portion where it is disposed lower (on the outside of) the first portion 13a) is surrounded by a one-dot chain line and is marked with hatching.

As shown in FIGS. 5 and 6, a second slit 16 is formed extending in the up and down direction (Z direction) between the short-side side face part 13 and the bottom face part 11. The ends of the first portion 13a and the second portion 13b on the second slit 16 side (the ends on the arrow X2 direction side) are respectively provided with a first engagement component 17a and a second engagement component 17b. The first and second engagement components 17a and 17b engage with the rear (the arrow Y2 direction side) of the end (the arrow X1 direction side) on the second slit 16 side of the bottom face part 11 in a state in which the reflective sheet 10 has been formed in a concave shape (see FIGS. 4 and 7) that conforms to the front of the rear frame 4 (the face on the arrow Y1 direction side). In FIG. 6, the first engagement component 17a and the second engagement component 17b are surrounded by a two-dot chain line and marked by hatching. As shown in FIG. 7, the first engagement component 17a and the second engagement component 17b are both configured so as to engage with the rear of the bottom face part 11 by going in below (on the arrow Y2 direction side of) the rear of the bottom face part 11 in a state in which the reflective sheet 10 has been formed in a concave shape that conforms to the front of the rear frame 4.

As shown in FIGS. 4 to 7, the reflective sheet 10 has a plurality of ears 18. The ears 18 are formed on the outer peripheral parts of the short-side face parts 13 and the long-side face parts 12 on the opposite side from the bottom face part 11. The ears 18 are attached to the outer peripheral part of the rear frame 4. Perforations 14c for folding the ears 18 with respect to the short-side face parts 13 and the long-side face parts 12 are formed at the boundaries between the ears 18 and the short-side face parts 13 and long-side face parts 12. These perforations 14c are similar to the above-mentioned perforations 14a and 14b in that their openings are closed during formation of the perforation 14c, so that they do not transmit light. As shown in FIGS. 5 and 6, a part of the ear 18 formed near the end on the first slit 15 side on the outer peripheral part of the second portion 13b of the short-side side face part 13 is removed so that the ears 18 of the first portion 13a and the second portion 13b do not overlap each other in a state in which the areas near the ends on the first slit 15 side of the first portions 13a and the second portions 13b are disposed so as to overlap each other (see FIGS. 4 and 7).

In this embodiment, with the above configuration, the reflective sheet 10 is folded so as to include the bottom face part and the four side face parts (the pair of long-side side face parts 12 and the pair of short-side side face parts 13). Thus, there is no need to form slits at the four corners of the reflective sheet 10 (the boundaries of the four side face parts). Therefore, no gaps occur in the four corners of the reflective sheet 10. Consequently, all of the light irradiating the four corners of the reflective sheet 10 is reflected without leaking. Therefore, the four corners of the display screen are kept from being displayed darker. Also, the first slits 15 that separate the short-side side face parts 13 in the first portion 13a and the second portion 13b are formed near the center of the short-side side face parts 13. The first portion 13a and the second portion 13b are disposed so as to overlap each other near the ends on the first slit 15 side. Thus, unlike when the first portion 13 a and the second portion 13b that are adjacent via the first slit 15 are disposed so that their ends contact with each other, a gap is kept from occurring at the boundary between the first portion 13a and the second portion 13b. Thus, the light from the LEDs 7 can be kept from leaking out through gaps at the boundaries between the first portions 13a and the second portions 13b. This also keeps the display screen from being displayed darker.

Also, in this embodiment, as discussed above, the second slits 16 are formed between the bottom face part 11 and the short-side side face parts 13 having the first and second portions 13a and 13b. The first and second engagement components 17a and 17b are respectively provided to the ends on the second slits 16 side of the first portions 13a and the second portions 13b. The first and second engagement components 17a and 17b engage with the rear of the ends on the second slit 16 side of the bottom face part 11 (the face on the arrow Y2 direction side). Consequently, engaging the rear of the ends of the bottom face part 11 on the second slit 16 side with the first and second engagement components 17a and 17b provided respectively to the first and second portions 13a and 13b keeps the second slits 16 between the short-side side face parts 13 and the bottom face part 11 from spreading out. Thus, light from the LEDs 7 is kept from leaking out through the second slits 16. Also, the overlapping of the first and second portions 13a and 13b is kept from being eliminated by the spreading out of the second slits 16.

Also, in this embodiment, as discussed above, the ears 18 are formed at the outer peripheral parts of the first and second portions 13a and 13b on the opposite side from the bottom face part 11. The ears 18 are attached to the outer peripheral part of the rear frame 4. A portion of the ear 18 formed at the outer peripheral part of the second portion 13b near the end on the first slit 15 side is removed so that the ears 18 formed at the outer peripheral parts of the first and second portions 13a and 13b will not overlap each other in a state in which the first and second portions 13a and 13b are disposed so as to overlap each other near their ends on the first slit 15 side. Consequently, even though the first and second portions 13a and 13b are disposed so as to overlap each other near their ends on the first slit 15 side, the ears 18 formed on the outer peripheral parts of the first and second portions 13a and 13b do not overlap each other near their ends on the first slit 15 side. Thus, the thickness of the ears 18 can be kept uniform at the outer peripheral parts of the first and second portions 13a and 13b.

Also, in this embodiment, as discussed above, the first and second portions 13a and 13b are disposed so as to overlap each other near their ends on the first slit 15 side. Specifically, one of the first and second portions 13a and 13b that is longer in a direction that intersects the extension direction of the first slit 15 along the outer peripheral part on the opposite side from the bottom face part 11 (the first portion 13a, which has a length L1 that is greater than the length L2 of the second portion 13b; see FIG. 5) is disposed on the upper side (the inside). Consequently, the one of the first and second portions 13a and 13b that is more bendable (e.g., the first portion 13a, which is longer in a direction that intersects the extension direction of the first slit 15 in the outer peripheral part on the opposite side from the bottom face part 11 than the second portion 13b) is supported from the lower side (the outside) by the other one of the first and second portions 13a and 13b that is less bendable (e.g., the second portion 13b, which is shorter in a direction that intersects the extension direction of the first slit 15 in the outer peripheral part on the opposite side from the bottom face part 11 than the first portion 13a). Thus, the shape of the reflective sheet 10 will be more stable. Also, thus stabilizing the shape of the reflective sheet 10 keeps a gap from occurring between the first and second portions 13a and 13b. Therefore, light from the LEDs 7 is kept from leaking out through a gap between the first and second portions 13a and 13b.

Also, in this embodiment, as discussed above, the bottom face part 11 is formed in a rectangular shape having a pair of long sides and a pair of short sides. The first slits 15 are formed on both of the pair of short-side side face parts 13 corresponding to the pair of short sides of the bottom face part 11. Consequently, unlike when the first slits 15 are formed in the long-side side face parts 12 corresponding to the long sides of the bottom face part 11, the lengths (L1 and L2; see FIG. 5) of the two portions (the first portion 13a and the second portion 13b) separated by the first slits 15 in a direction that intersects the extension direction of the first slits 15 along the outer peripheral parts of these two portions will be shorter. Thus, the first and second portions 13a and 13b can be made less bendable. This further stabilizes the shape of the reflective sheet 10. Also, by forming the first slits 15 in both of the pair of short-side side face parts 13, unlike when the first slit 15 is formed in just one of the pair of short-side side face parts 13, the first and second portions 13a and 13b that are disposed so as to overlap each other will be disposed in good balance on both of the pair of short sides of the bottom face part 11. Thus, the shape of the reflective sheet 10 can be further stabilized.

Also, in this embodiment, as discussed above, the perforations 14a, whose openings are closed during their formation, are formed at the boundaries of the four side face parts (the pair of long-side side face parts 12 and the pair of short-side side face parts 13) of the reflective sheet 10. Consequently, closing the openings during the formation of the perforations 14a keeps light from leaking out from the perforations 14a, and the reflective sheet 10 can be folded along these perforations 14a. This allows the reflective sheet 10 including the rectangular bottom face part 11 and the four side face parts to be easily configured.

The embodiment disclosed herein is just an example in every respect, and should not be interpreted as being limiting in nature. The scope of the invention being indicated by the appended claims rather than by the above description of the embodiments, all modifications within the meaning and range of equivalency of the claims are included.

For example, in the above embodiment, a liquid crystal television set is used as an example of the display device of the present invention. However, the present invention is not limited to this. Besides a liquid crystal television set, the present invention can also be applied to any normal display device, such as a PC (personal computer) display device.

Also, in this embodiment, the perforations whose openings are closed during formation are formed at the portions where the reflective sheet is folded (such as the boundaries of the four side face parts). However, the present invention is not limited to this. With the present invention, fold lines (creases) for facilitating the folding of the reflective sheet can be formed instead of perforations at the portions where the reflective sheet is folded.

Figure 8:
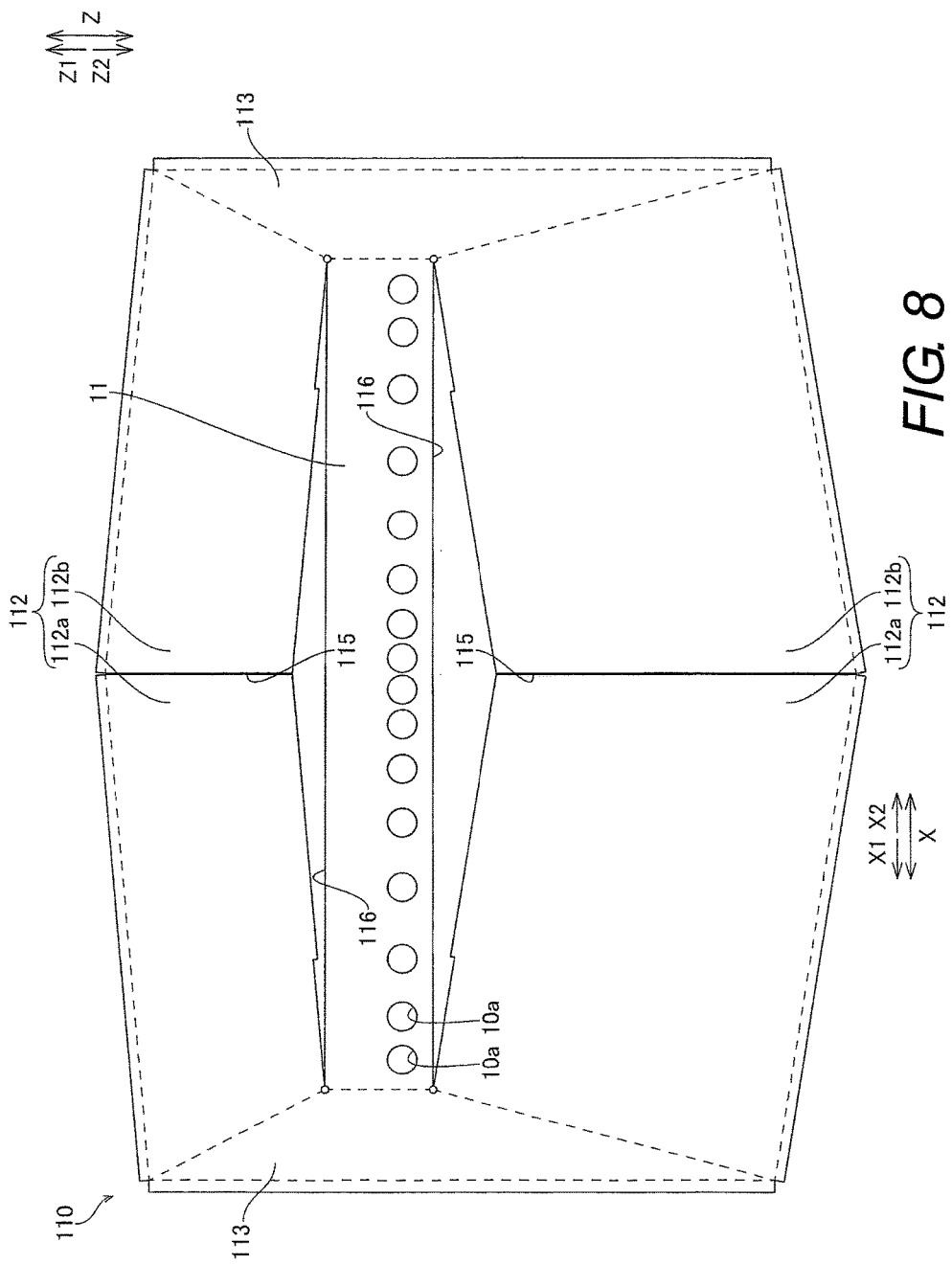
FIG. 8 is a development view of a reflective sheet in accordance with a first modification example.

Also, in this embodiment, the first slits are formed at the short-side side face parts. However, the present invention is not limited to this. With the present invention, the first slits can instead be formed at the long-side side face parts. For example, as shown in FIG. 8, a reflective sheet 110 in accordance with a first modification example includes a pair of first slits 115. The first slits 115 are provided to both of a pair of long-side side face parts 112.

Specifically, as shown in FIG. 8, the reflective sheet 110 is configured so that it can be folded so as to include a rectangular bottom face part 11 that extends in the left and right direction (X direction), and four side face parts (a pair of long-side side face parts 112 and a pair of short-side side face parts 113) disposed so as to surround the four sides of the bottom face part 11. With this first modification example, the first slits 115 are formed in the center of the long-side side face parts 112 in the left and right direction (X direction), and extend in the up and down direction (Z direction) so as to separate the long-side side face parts 112 into first portions 112a and second portions 112b. In the first modification example, the reflective sheet 110 also includes second slits 116 extending in the left and right direction. The second slits 116 are formed between the bottom face part 11 and the long-side side face parts 112.

In the first modification example, as discussed above, the first slits 115 are formed in the long-side side face parts 112. As a result, the long-side side face parts 112, which by being longer are more bendable than the short-side side face parts 113, can be separated into first portions 112a and second portions 112b that are shorter (less bendable) than the long-side side face parts 112 by the first slits 115. This suppresses the bending of the long-side side face parts 112.

Also, with the present invention, the first slits are formed on both of the pair of short-side side face parts. However, the present invention is not limited to this. With the present invention, the first slit can be formed in just one of the pair of short-side side face parts. Also, with the present invention, as shown in FIG. 9, a reflective sheet 210 in accordance with a second modification example includes a first slit 215 formed in just one of a pair of long-side side face parts 212.

Figure 9:
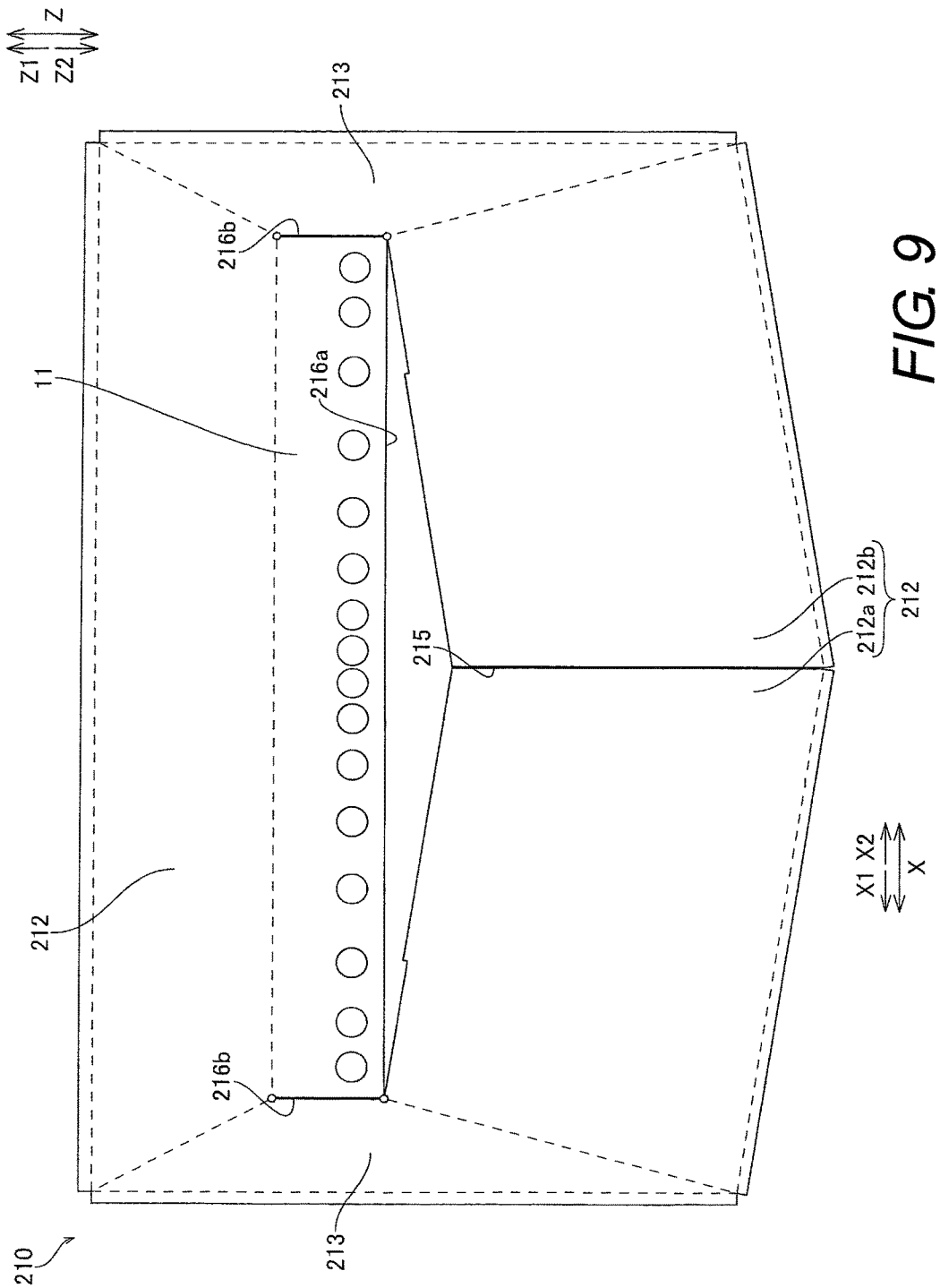
FIG. 9 is a development view of a reflective sheet in accordance with a second modification example.

Specifically, as shown in FIG. 9, the reflective sheet 210 is configured so that it can be folded so as to include a rectangular bottom face part 11 that extends in the left and right direction (X direction), and four side face parts (a pair of long-side side face parts 212 and a pair of short-side side face parts 213) disposed so as to surround the four sides of the bottom face part 11. With this second modification example, the first slit 215 extending in the up and down direction (Z direction) so as to separate the long-side side face parts 212 into first portions 212a and second portions 212b are formed only in the long-side side face part 212 on the lower side (the arrow Z2 direction side) out of the pair of long-side side face parts 212. Also, in the second modification example, the reflective sheet 210 includes a second slit 216a and a pair of slits 216b. The second slit 216a extends in the left and right direction, and is formed between the bottom face part 11 and the long-side side face part 212 in which the first slit 215 is formed. The slits 216b extend in the up and down direction, and are formed between the bottom face part 11 and the pair of short-side side face parts 213.

In this second modification example, as discussed above, the first slit 215 is formed in only one of the pair of long-side side face parts 212. Thus, unlike in the first modification example above (see FIG. 8) in which the first slits 115 are formed in both of the pair of long-side side face parts 112, there are fewer places separated by the first slit 215. Therefore, there are fewer portions where a gap is likely to occur due to the presence of the first slit 215 (the portion between the first portion 212a and the second portion 212b). Consequently, light is better kept from leaking out through the gap between the first portion 212a and the second portion 212b.

Also, in the above embodiment, the reflective sheet is configured by folding a single plastic sheet having optical reflectivity. However, the present invention is not limited to this. With the present invention, as shown in FIG. 10, a reflective sheet 310 in accordance with a third modification example can be made up of a combination of two separate reflective sheets 310a and 310b.

Figure 10:
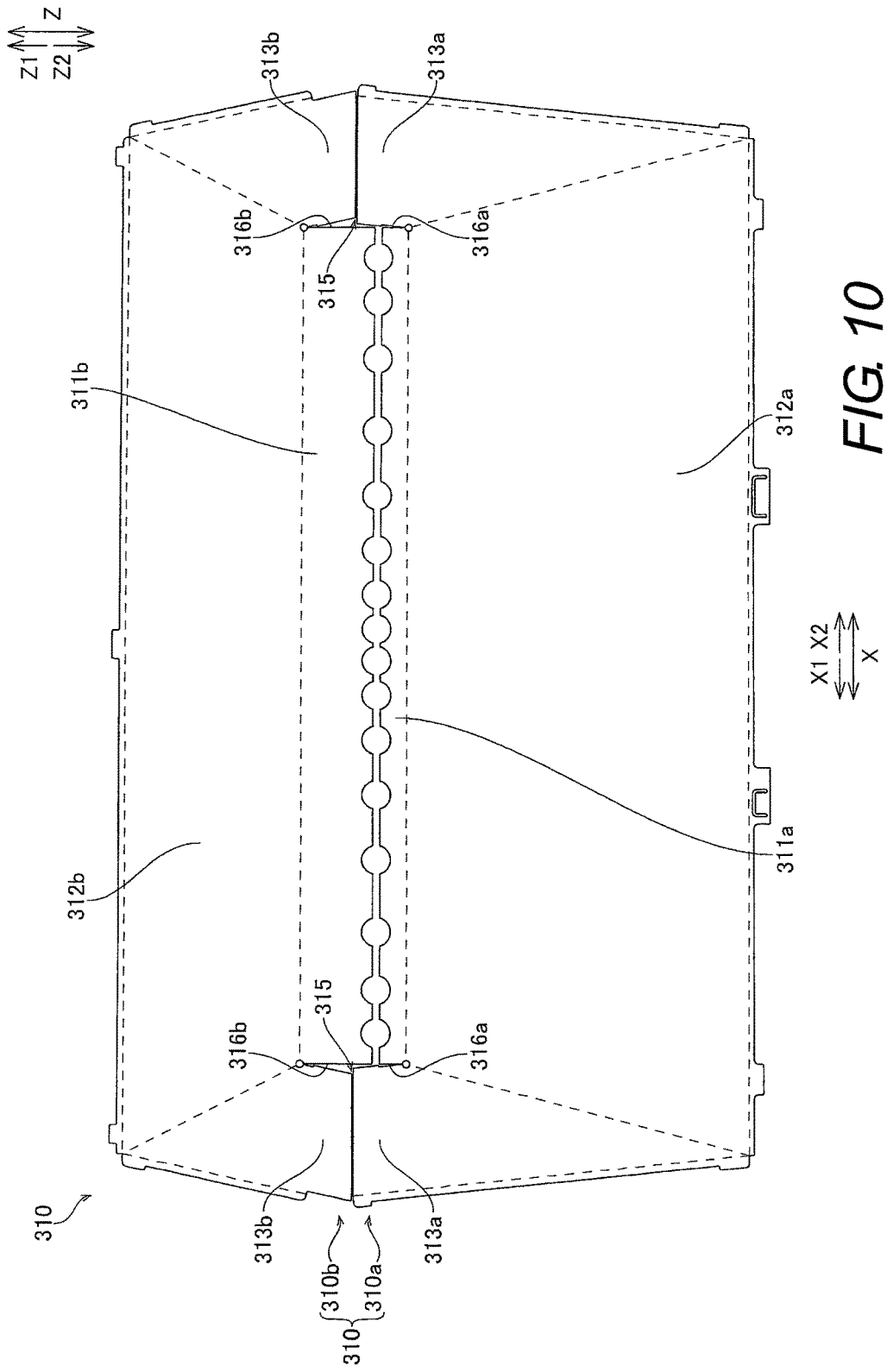
FIG. 10 is a development view of a reflective sheet in accordance with a third modification example.

Specifically, as shown in FIG. 10, the reflective sheet 310a includes a bottom face part 311a extending in the left and right direction (X direction), a long-side side face part 312a connected to one long side of the bottom face part 311a on the opposite side from a bottom face part 311b of the reflective sheet 310a, and a pair of short-side side face parts 313a disposed adjacent to the pair of short sides of the bottom face part 311a and connected to the long-side side face part 312a. On the other hand, the reflective sheet 310b includes a bottom face part 311b extending in the left and right direction (X direction), a long-side side face part 312b connected to one long side of the bottom face part 311b on the opposite side from the bottom face part 311a, and a pair of short-side side face parts 313b disposed adjacent to the pair of short side of the bottom face part 311b and connected to the long-side side face part 312b. The bottom face parts 311a and 311b form a rectangular bottom face part. The portions of the reflective sheet 310a near the upper end of the short-side side face parts 313a (the portions near the ends on the arrow Z1 direction side), and the portions of the reflective sheet 310b near the lower ends of the short-side side face parts 313b (the portions near the ends on the arrow Z2 direction side) are configured so as to overlap each other in a state in which the reflective sheets 310a and 310b have been put together. The short-side side face parts 313a and 313b are examples of the "first portion" and "second portion" of the present invention, respectively.

In the third modification example, the end edges of the reflective sheet 310a on the upper side (the arrow Z1 direction side) of the short-side side face parts 313a, and the end edges of the reflective sheet 310b on the lower side (the arrow Z2 direction side) of the short-side side face parts 313b are disposed so as to be opposite each other with first slits 315 extending in the left and right direction (X direction) in between, in a state in which the reflective sheets 310a and 310b have been spread out flat. In the third modification example, the reflective sheets 310a and 310b includes second slits 316a and 316b extending in the up and down direction (Z direction). The second slits 316a are respectively formed between the bottom face part 311a and the short-side side face parts 313a of the reflective sheet 310a, while the second slits 316b are respectively formed between the bottom face part 311b and the short-side side face parts 313b of the reflective sheet 310b. In the third modification example here, the reflective sheet 310a is folded without forming slits at the boundaries between the long-side side face part 312a and the short-side side face parts 313a, while the reflective sheet 310b is folded without forming slits at the boundaries between the long-side side face part 312b and the short-side side face parts 313b. Consequently, again in the third modification example, just as in the above embodiment, no gap occurs at the four corners of the reflective sheet 310. Thus, the four corners of the display screen are kept from being displayed darker.

In the above embodiment, as shown in FIG. 5, the first slits 15 are disposed at the positions of the short-side side face parts 13 corresponding to the center of the bottom face part 11 of the reflective sheet 10 in the up and down direction (Z direction). However, the present invention is not limited to this. With the present invention, as shown in FIG. 11, a reflective sheet 410 in accordance with a fourth embodiment can include the first slits 15 disposed at the positions of short-side side face parts 413 corresponding to the lower end of the bottom face part 11 of the reflective sheet 410 (the end on the arrow Z2 direction side).

Figure 11:
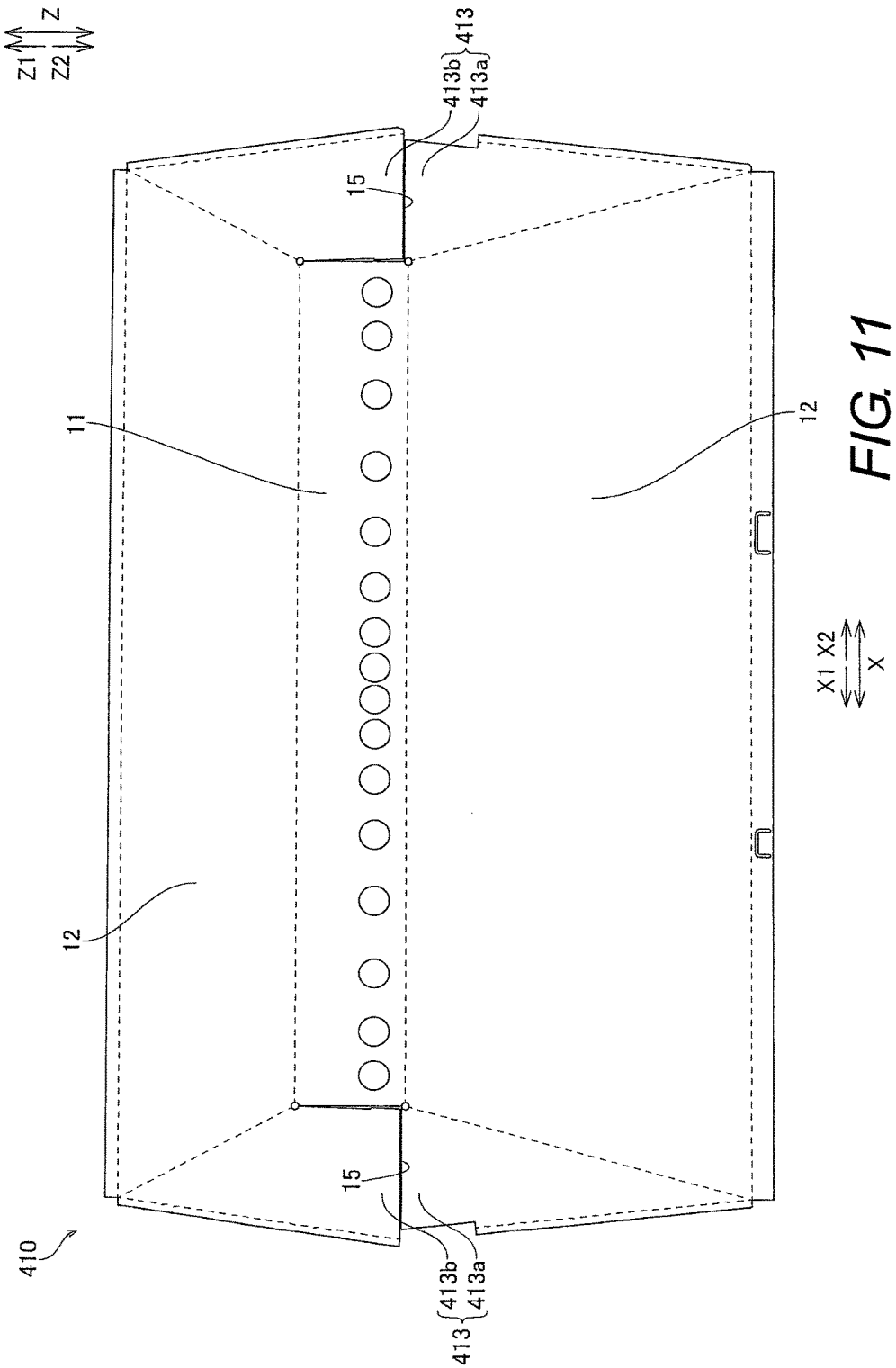
FIG. 11 is a development view of a reflective sheet in accordance with a fourth modification example.

Specifically, as shown in FIG. 11, the first slits 15 are formed so as to separate the short-side side face parts 413 into first and second portions 413a and 413b, respectively. The first portions 413a are disposed lower than (on the arrow Z2 direction side of) the second portions 413b, respectively. In this fourth modification example, the configuration is such that the second portions 413b are disposed above (on the inside of) the first portions 413a in a state in which the first and second portions 413a and 413b overlap each other near their ends on the first slit 15 side. Consequently, unlike in the above embodiment (see FIG. 7) in which the first portion 13a is disposed above (on the inside of) the second portion 13b, the first portions 413a can be held down from above (the inside) to the rear frame 4 side (see FIG. 4) by the second portions 413b, which are less bendable than the first portion 413a because their outer peripheral part is shorter in length. Thus, the reflective sheet 410 can be easily put into a shape that conforms to the rear frame 4.

Figure 12:
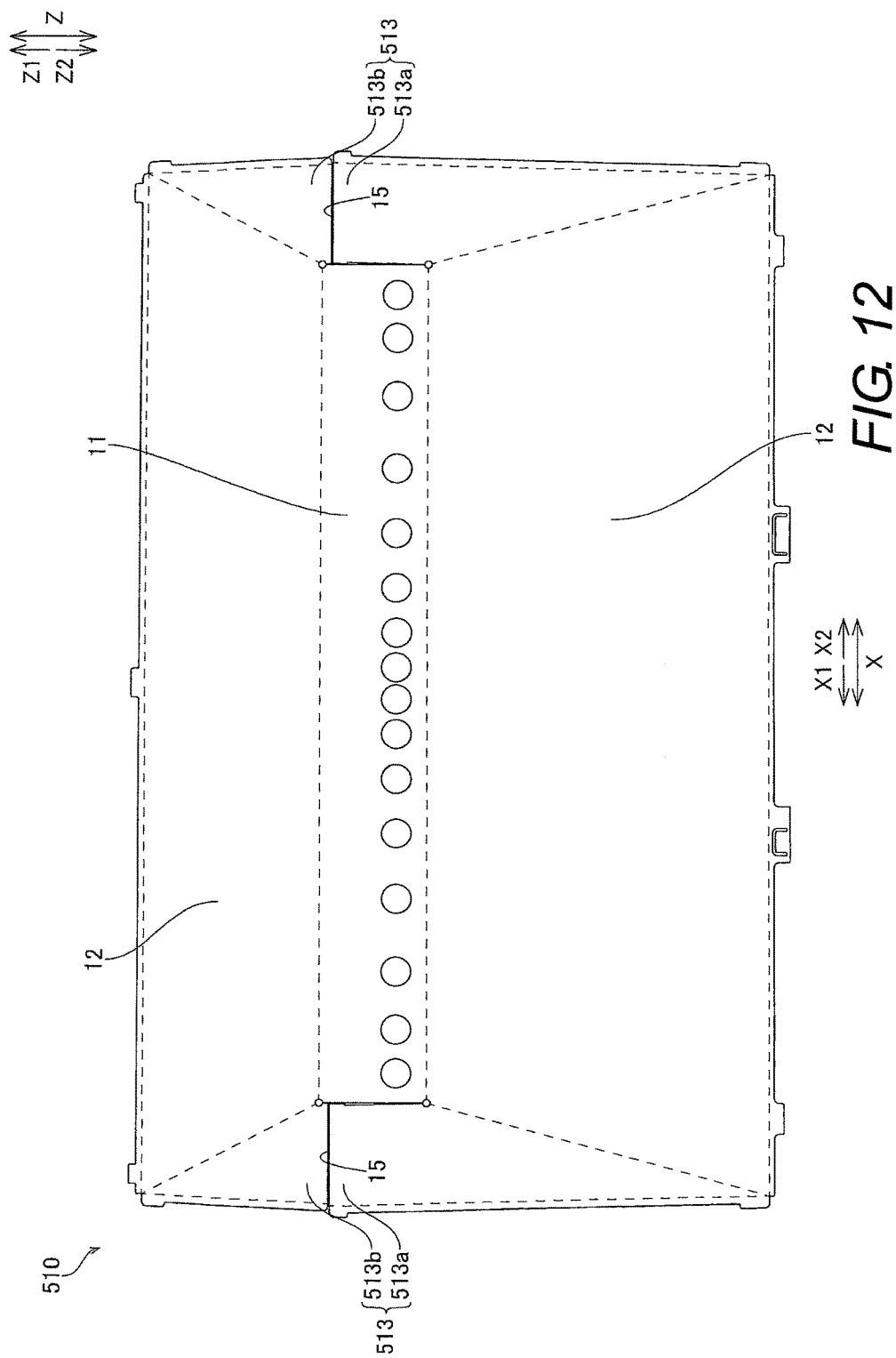
FIG. 12 is a development view of a reflective sheet in accordance with a fifth modification example.

Also, with the present invention, as shown in FIG. 12, a reflective sheet 510 in accordance with a fifth modification example can include the first slits 15 disposed at the positions of short-side side face parts 513 corresponding to the upper end of the bottom face part 11 of the reflective sheet 510 (the end on the arrow Z1 direction side).

Specifically, as shown in FIG. 12, the first slits 15 pertaining to the fifth modification example are formed so as to separate the short-side side face parts 513 into first and second portions 513a and 513b. The first portions 513a are disposed lower than (on the arrow Z2 direction side of) the second portions 513b, respectively. In this fifth modification example, the slope angle of the outer peripheral parts of the first and second portions 513a and 513b in the up and down direction is smaller than in the above embodiment (see FIG. 5) in which the first slits 15 are disposed at the positions of the short-side side face parts 13 corresponding to the center of the bottom face part 11 in the up and down direction. Consequently, in this fifth modification example, the surface area when the reflective sheet 510 is spread out flat is smaller than in the above embodiment. Thus, when the reflective sheets 510 are formed by punching out a single, large, plastic sheet having optical reflectivity, the single, large, plastic sheet can be used more efficiently.

Figure 13:
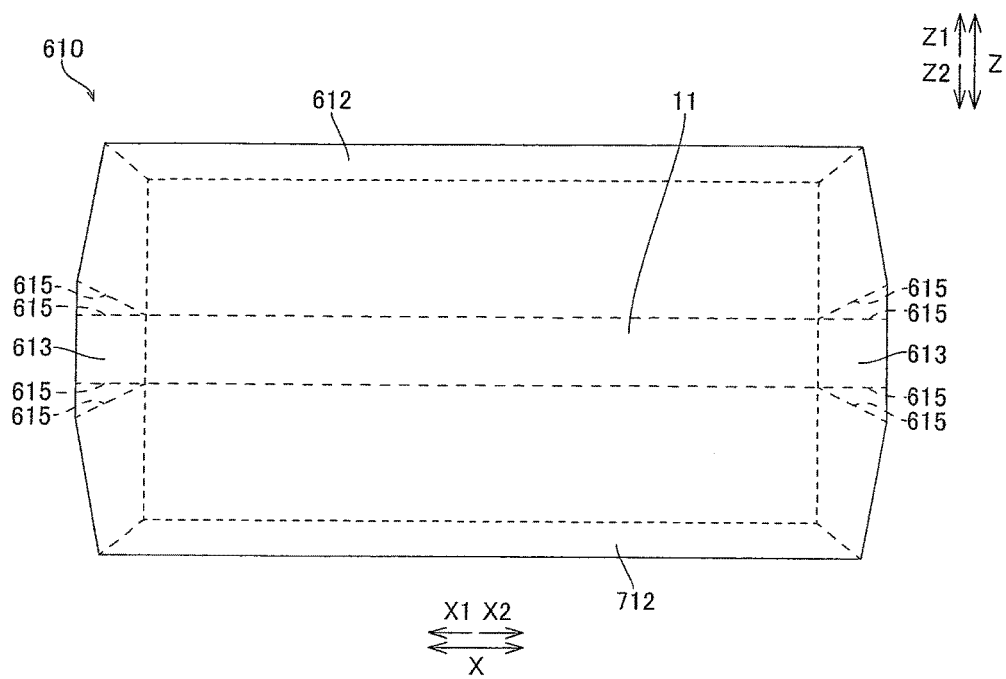
FIG. 13 is a development view of a reflective sheet in accordance with a sixth modification example.

Also, in the above embodiment, the reflective sheet 10 in which slits (the first slits 15) are formed near the center of the short-side side face parts 13. However, the present invention is not limited to this. With the present invention, as shown in FIG. 13, a reflective sheet 610 in accordance with a sixth modification example can be used in which fold lines 615 are formed near the center of short-side side face parts 613. In FIG. 13, the holes corresponding to the holes 10a (see FIG. 5) in the above embodiment are not shown for simplifying the illustration. Again in this sixth modification example, just as in the above embodiment, when the reflective sheet 610 is folded into a concave shape so as to include the bottom face part 11 and four side face parts (a pair of long-side side face parts 612 and a pair of short-side side face parts 613), no gaps occur at the four corners of the reflective sheet 610 (the boundaries of the four side face parts). Thus, all of the light irradiating the four corners of the reflective sheet 610 can be reflected without leaking. As a result, the four corners of the display screen can be kept from being displayed darker.

With the sixth modification example shown in FIG. 13, no slit is formed at any portion of the reflective sheet 610. Thus, no gaps that would otherwise be caused by slits will occur even when the reflective sheet 610 is folded into a concave shape. Consequently, the overall shape of the reflective sheet 610 is not lost due to spreading out of gaps attributable to slits. Thus, the overall shape of the reflective sheet 610 can be easily maintained.

Figure 14:
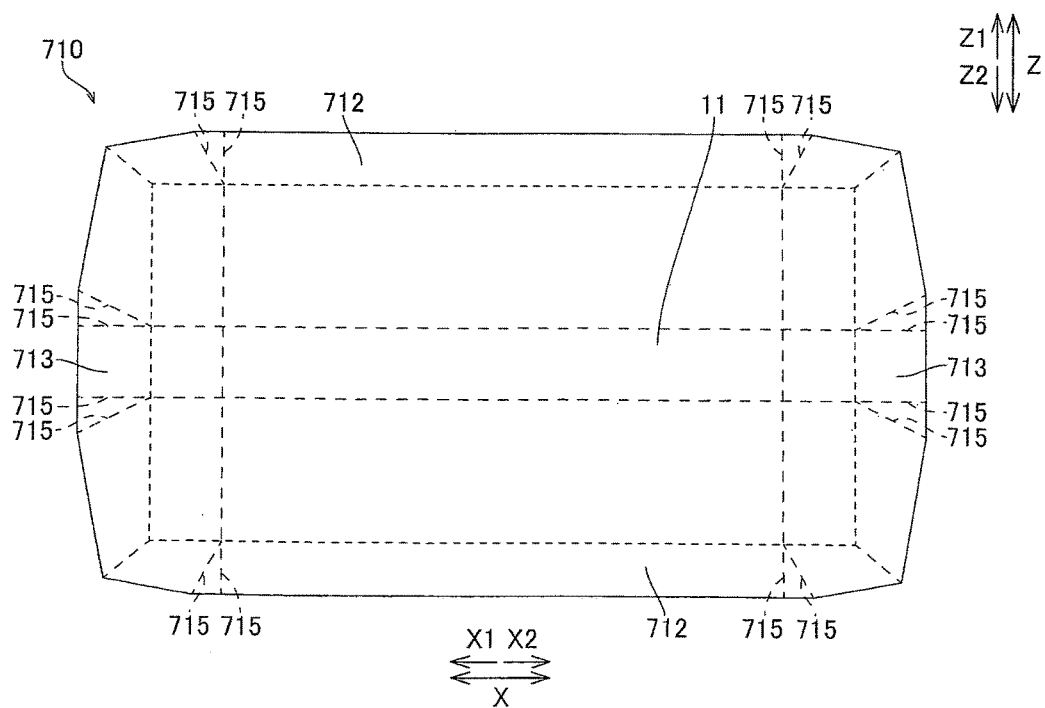
FIG. 14 is a development view of a reflective sheet in accordance with a seventh modification example.

Also, with the present invention, as shown in FIG. 14, a reflective sheet 710 in accordance with a seventh modification example can be used in which fold lines 715 are formed on both long-side side face parts 712 and short-side side face parts 713. In FIG. 14, just as in FIG. 13, the holes corresponding to the holes 10a (see FIG. 5) in the above embodiment are not shown for simplifying the illustration. Again in this seventh modification example shown in FIG. 14, just as in the above sixth modification example shown in FIG. 13, no slit is formed in any portion of the reflective sheet 710. Thus, no gaps that would otherwise be caused by slits will occur. As a result, the display screen can be kept from being displayed darker, and the overall shape of the reflective sheet 710 can be easily maintained.

In the illustrated embodiment, the display device includes a display component, a light source, a rear side support member, and a reflective sheet. The light source is disposed on a rear side (e.g., a rear face side) of the display device relative to the display component. The light source is configured to irradiate the display component with light. The rear side support member supports the light source from the rear side. The reflective sheet is configured to reflect the light from the light source towards the display component. The reflective sheet includes a bottom face part, a first side face part and a second side face part. The bottom face part is disposed on a front side of the display device relative to the rear side support member. The first and second side face parts are arranged relative to the bottom face part corresponding to adjacent side edges (e.g., a long side and a short side) of the bottom face part, respectively. One of the first and second side face parts includes first and second portions with adjacent end sections, respectively. The adjacent end sections overlap with respect to each other while the reflective sheet is attached to the rear side support member.

With this display device, the first and second portions can be spaced apart from each other with a first slit therebetween. The adjacent end sections of the first and second portions can be adjacent to each other via the first slit.

With this display device, the first slit separates at least one of the first and second side face parts into the first portion and the second portion. The reflective sheet can be folded so as to include the bottom face part and the first and second side face parts. In this case, there is no need to form a slit at the corner of the reflective sheet (at the boundary of the first and second side face parts). Thus, no gaps occur at the corner of the reflective sheet. Consequently, the light shined on the corner of the reflective sheet is totally reflected, without any leakage. This keeps the corner of the display screen from being displayed darker. Also, the first slit that separates the one of the first and second side face parts into the first portion and the second portion can be formed near the center of the one of the first and second side face parts. The first portion and the second portion can be disposed so as to overlap each other near the adjacent end sections (e.g., ends on the first slit side). Thus, unlike when the first portion and the second portion adjacent via the first slit are disposed so that their ends contact with each other, gaps will be kept from being formed at the boundary between the first portion and the second portion. Thus, light from the light source is kept from leaking out through a gap at the boundary between the first portion and the second portion. This also keeps the display screen from being displayed darker.

With the display device, the one of the first and second side face parts can be spaced apart from the bottom face part with a second slit therebetween. The first and second portions can have first and second engagement components, respectively, that engage with the bottom face part from the rear side while the reflective sheet is attached to the rear side support member. Specifically, with the display device, the second slit can be formed between the bottom face part and the one of the first and second side face parts having the first portion and the second portion. The first and second engagement components that engage with the back of the end of the bottom face part on the second slit side can be respectively provided to the ends of the first and second portions on the second slit side. With this configuration, the first and second engagement components provided to the first and second portions, respectively, engage with the rear of the end of the bottom face part on the second slit side. This keeps the second slit from spreading wide between the bottom face part and the one of the first and second side face parts having the first and second portions. Thus, light from the light source is kept from leaking out through the second slit. This also keeps the overlapping of the first portion and second portion from being eliminated due to the spreading out of the second slit.

With the display device, the first and second portions can have ear sections (e.g., ears) along outer peripheral edges (e.g., outer peripheral parts) of the first and second portions, respectively. The ear sections are attached to outer peripheral parts of the rear side support member while the reflective sheet is attached to the rear side support member. A portion of one of the ear sections is removed such that the ear sections do not overlap with respect to each other while the adjacent end sections of the first and second portions overlap with respect to each other. With this configuration, even though the first portion and second portion are disposed so that they overlap each other near their adjacent end sections on the first slit side, they will not overlap each other near the ends of the ear sections formed on the outer peripheral edges of the first and second portions on the first slit side. Thus, the thickness of the ear portions is kept uniform at the outer peripheral edges of the first and second portions.

With the display device, the first and second portions can have lengths measured in outer peripheral edges of the first and second portions, respectively. The length of one of the first and second portions can be larger than the length of the other of the first and second portions. The one of the first and second portions can be disposed on the front side of the display device with respect to the other of the first and second portions while the reflective sheet is attached to the rear side support member. With this display device, the one that is longer along the outer peripheral edge (e.g., the outer peripheral part on the opposite side from the bottom face part) can be disposed on the upper side. With this configuration, the one of the first and second portions that is more bendable (e.g., the one that is longer in a direction that intersects the extension direction of the first slit of the outer peripheral part on the opposite side from the bottom face part) is supported from the lower side (the outside) by the other of the first and second portions that is less bendable (e.g., the one that is shorter in a direction that intersects the extension direction of the first slit of the outer peripheral part on the opposite side from the bottom face part). Thus, the shape of the reflective sheet will be more stable. Also, thus stabilizing the shape of the reflective sheet keeps a gap from occurring between the first and second portions. Thus, light from the light source is kept from leaking out through a gap between the first portion and second portion.

With the display device, the bottom face part can have a rectangular shape with a pair of long sides and a pair of short sides. The one of the first and second side face parts can be arranged relative to the bottom face part corresponding to one of the short sides of the bottom face part. With this configuration, unlike when the first slit is formed on a side face part corresponding to the long side of the bottom face part, the length of the outer peripheral edges of the two portions (e.g., the first portion and second portion) separated by the first slit can be shorter in a direction that intersects the direction in which the first slit extends. Thus, the first portion and the second portion are less prone to bending. This makes the shape of the reflective sheet more stable.

In this case, the reflective sheet can further include a third side face part and a fourth side face part. The first and third side face parts can be oppositely arranged with respect to the bottom face part. The second and fourth side face parts can be oppositely arranged with respect to the bottom face part. One of the third and fourth side face parts that is oppositely arranged with respect to the bottom face part relative to the one of the first and second side face parts includes third and fourth portions (e.g., the first and second portions) that are spaced apart from each other with a third slit therebetween. With this display device, the third slit (e.g., the first slit) is formed in both of the opposite pair of side face parts corresponding to the pair of short sides of the bottom face part. With this configuration, unlike when the first slit is formed in only one of the pair of side face parts corresponding to the pair of short sides of the bottom face part, the first and second portions, which are disposed so as to overlap each other, can be disposed in good balance on both of the two short sides of the bottom face part. Thus, the shape of the reflective sheet will be even more stable.

With the display device, the reflective sheet can have a folding portion that connects at least one of between the bottom face part and one of the first and second side face parts and between the first side face part and the second side face part.

With the display device, the folding portion includes a perforation with closed openings that are closed during formation. In this case, the reflective sheet can be folded along the perforation that is formed at a boundary of the parts and whose openings are closed during formation so as to include the bottom face part and the first and second side face parts. With this configuration, because the openings of the perforation are closed during their formation, light is kept from leaking out through the perforation. Also, because the reflective sheet is folded along the perforation, the reflective sheet that includes the bottom face part and the first and second side face parts can be easily configured.

With the display device, the first and second portions can be connected with respect to each other with a folding portion therebetween. The adjacent end sections of the first and second portions can be adjacent to each other via the folding portion.

With the display device, the reflective sheet can be integrally formed by a sheet member as a one-piece, unitary member.

With the display device, one of the first and second portions can be connected to the other of the first and second side face parts with a folding portion therebetween. The folding portion forms a corner of the reflective sheet while while the reflective sheet is attached to the rear side support member.

With the present invention, as discussed above, the corner of a display screen are kept from being displayed darker.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display panel;
a light source;
a rear side support member supporting the light source from a rear side; and
a reflective sheet that reflects light from the light source towards the display panel,
the reflective sheet including a rectangular bottom face part with four sides and four corners, a first side face part that is arranged along a first side of the four sides, and a second side face part that is arranged along a second side of the four sides that is adjacent to the first side, the first side face part including first and second portions, the first and second portions partially overlapping with respect to each other to form an overlapping portion, with the overlapping portion being entirely spaced apart from all of the corners of the bottom face part.

2. The display device according to claim 1, wherein
the first and second portions are spaced apart from each other with a first slit therebetween, with first and second end edges of the first and second portions being adjacent to each other via the first slit.

3. The display device according to claim 2, wherein
the first side face part is spaced apart from the bottom face part with a second slit therebetween, and
the first and second portions have first and second engagement components, respectively, that engage with the bottom face part from the rear side while the reflective sheet is attached to the rear side support member.

4. The display device according to claim 1, wherein
the first and second portions have ear sections along outer peripheral edges of the first and second portions, respectively, the ear sections being attached to outer peripheral parts of the rear side support member while the reflective sheet is attached to the rear side support member, and
a portion of one of the ear sections is removed, with the ear sections non-overlapping with respect to each other while the first and second portions partially overlap with respect to each other.

5. The display device according to claim 1, wherein
the first and second portions have lengths measured along outer peripheral edges of the first and second portions, respectively, the length of one of the first and second portions being larger than the length of the other of the first and second portions, and
the one of the first and second portions is disposed on a front side of the display device with respect to the other of the first and second portions while the reflective sheet is attached to the rear side support member.

6. The display device according to claim 1, wherein
the four sides of the bottom face part includes a pair of long sides and a pair of short sides, and
the first side face part is arranged relative to the bottom face part corresponding to one of the short sides of the bottom face part.

7. The display device according to claim 6, wherein
the reflective sheet further includes a third side face part and a fourth side face part, the first and third side face parts being oppositely arranged with respect to the bottom face part, the second and fourth side face parts being oppositely arranged with respect to the bottom face part, and
the third side face part includes third and fourth portions that are spaced apart from each other with a third slit therebetween.

8. The display device according to claim 1, wherein
the reflective sheet has a folding portion that connects at least one of between the bottom face part and one of the first and second side face parts and between the first side face part and the second side face part.

9. The display device according to claim 8, wherein
the folding portion includes a perforation with closed openings that are closed during formation.

10. The display device according to claim 1, wherein
the reflective sheet is integrally formed by a sheet member as a one-piece, unitary member.

11. The display device according to claim 1, wherein
the first and second portions partially overlap with respect to each other between adjacent corners of the corners of the bottom face part at locations spaced from the adjacent corners while the reflective sheet is attached to the rear side support member.

12. The display device according to claim 1, wherein
the first and second portions partially overlap with respect to each other while the reflective sheet is attached to the rear side support member.

13. The display device according to claim 1, wherein
the first side face part is entirely separated from the first side of the bottom face part.

14. A display device comprising:
a display panel;
a light source disposed on a rear side of the display device relative to the display panel;
a rear side support member supporting the light source from the rear side; and
a reflective sheet that reflects light from the light source towards the display panel,
the reflective sheet including a bottom face part, a first side face part and a second side face part, the first and second side face parts being arranged relative to the bottom face part corresponding to adjacent sides of the bottom face part, respectively, the first side face part including first and second portions, the first portion including a first end section, the second portion including a second end section that is adjacent to the first end section, the first and second end sections overlapping with respect to each other while the reflective sheet is attached to the rear side support member,
one of the first and second portions being connected to the second side face part via a folding portion, with the folding portion forming a corner of the reflective sheet while the reflective sheet is attached to the rear side support member,
the first end section having a first end edge, the second end section having a second end edge, the first and second end edges being spaced apart from the folding portion.

15. The display device according to claim 14, wherein
the first and second portions are spaced apart from each other with a first slit therebetween, with first and second end edges of the first and second portions being adjacent to each other via the first slit.

16. The display device according to claim 15, wherein
the first side face part is spaced apart from the bottom face part with a second slit therebetween, and
the first and second portions have first and second engagement components, respectively, that engage with the bottom face part from the rear side while the reflective sheet is attached to the rear side support member.

17. The display device according to claim 14, wherein
the bottom face part has a rectangular shape with a pair of long sides and a pair of short sides, and
the first side face part is arranged relative to the bottom face part corresponding to one of the short sides of the bottom face part.

18. The display device according to claim 14, wherein
the reflective sheet has a folding portion that connects at least one of between the bottom face part and one of the first and second side face parts and between the first side face part and the second side face part.

19. The display device according to claim 18, wherein
the folding portion includes a perforation with closed openings that are closed during formation.

* * * * *